United States Patent

Dohmori et al.

[11] 3,882,125
[45] May 6, 1975

[54] 2,9-DIOXO-3,6 SUBSTITUTED THIAZOLO[5,4-F] QUINOLINE-8-CARBOXYLATES

[75] Inventors: Renzo Dohmori, Yachiyo; Shizuo Kadoya, Tokyo; Senkichi Nagasaki, Funabashi; Hidemasa Ogawa, Tokyo, all of Japan

[73] Assignee: Daiichi Seiyaku Co., Ltd., Tokyo, Japan

[22] Filed: Oct. 26, 1972

[21] Appl. No.: 300,950

[30] Foreign Application Priority Data

Oct. 26, 1971 Japan.............................. 46-84846

[52] U.S. Cl. .... 260/283 S; 260/247.1; 260/247.2 R; 260/247 S; 260/268 BQ; 260/287 R; 260/304; 260/306; 260/307 R; 424/258
[51] Int. Cl............................................. C07d 91/42
[58] Field of Search...................... 260/287 R, 283 S

[56] References Cited
UNITED STATES PATENTS

| | | | |
|---|---|---|---|
| 3,287,458 | 11/1966 | Kaminsky et al. | 260/287 R |
| 3,313,818 | 4/1967 | Lesher | 260/287 R |
| 3,496,184 | 2/1970 | Mizzoni et al. | 260/287 R |
| 3,714,170 | 1/1973 | Dahmori et al. | 260/287 R |

Primary Examiner—Donald G. Daus
Assistant Examiner—David E. Wheeler
Attorney, Agent, or Firm—Sughrue, Rothwell, Mion, Zinn & MacPeak

[57] ABSTRACT

A compound having the formula

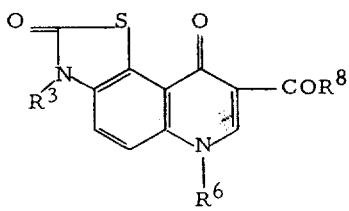

wherein $R^3$ is an alkyl or alkenyl group; $R^6$ is an alkyl group; and $R^8$ is an —OR, —R' or —NHR" group, in which R is a member selected from the group consisting of an alkylaminoalkyl, a piperidinoalkyl, an alkylpiperidinoalkyl, a morpholinoalkyl, an acyloxyalkyl, a hydroxyalkyl, a halogenoalkyl or an alkenyl group; R' is an alkylpiperazino group; and R" is an alkylpiperazino or an alkylaminoalkyl group, or the acid-addition salt thereof.

21 Claims, No Drawings

2,9-DIOXO-3,6 SUBSTITUTED THIAZOLO [5,4-F] QUINOLINE-8-CARBOXYLATES

SUMMARY OF THE INVENTION

Field of the Invention

The present invention relates to novel thiazoloquinoline derivatives and a method for preparing the same. More particularly, it relates to a compound represented by the following formula:

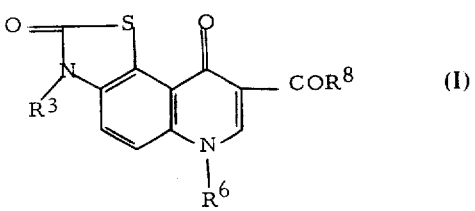

wherein $R^3$ is an alkyl or alkenyl group; $R^6$ is an alkyl group; and $R^8$ is —OR, —R' or —NHR'', in which R is an alkyl group, an alkylaminoalkyl group, a piperidinoalkyl group, an alkylpiperidinoalkyl group, a morpholinoalkyl group, an oxomorpholinoalkyl group, an oxooxazolidinoalkyl group, an alkylpiperazinoalkyl group, an acyloxyalkyl group, a hydroxyalkyl group, a halogenoalkyl group or an alkenyl group; R' is an alkylpiperazino group, and R'' is an alkylpiperazino or an alkylaminoalkyl group. In this specification and claims, the term "alkyl" and "alkenyl" mean a lower alkyl or lower alkenyl group having from one to six carbon atoms, respectively.

The object of this invention is to provide novel compounds exhibiting strong and long effective antibacterial activity.

The compounds of this invention can be prepared according to the following reaction schematic:

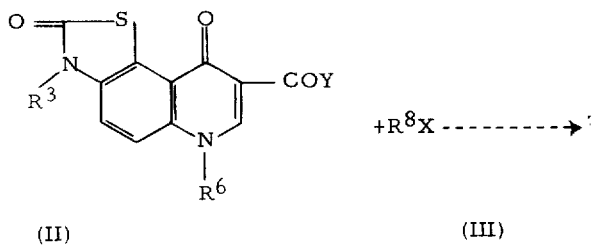 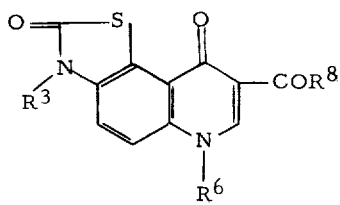

wherein $R^3$, $R^6$ and $R^8$ have the same meanings as defined above; X is a hydrogen atom, a hydroxy group or a halogen atom and Y is a hydroxy group or a halogen atom; however, X and Y are selected from the recited combination so that the two are different from each other.

DETAILED DESCRIPTION OF THE INVENTION

The starting materials of this process are novel compounds as well, and they can be synthesized according to the method illustrated in Example 1 and Example 2.

The reaction of this invention is generally carried out in a suitable solvent, preferably in the presence of an acid-acceptor. The acid-acceptor includes an organic or inorganic base such as potassium carbonate, sodium hydroxide triethylamine and the like, or a mixture thereof. As for the solvent, use can be made of various anhydrous solvents which dissolve the compound (III) slightly or greatly and do not react with the starting material (II). For example, dimethylformamide, dimethylsulfoxide, dichloroethane, and alcohols, such as n-propanol, n-butanol, and the like are suitable.

More precisely describing the performance of the reaction, the starting material (II) is dissolved or suspended in the solvent and is made to react with the compound (III) at a temperature of from room temperature to 200°C. The reaction generally proceeds for 30 minutes to 20 hours and under such condition the objective product can be provided in a good yield.

Some of the object products of which $R^8$ is a substituted aminoalkyloxy group, a substituted aminoalkylamino group, an alkylpiperazino group, or others, can be easily converted to a quarternary ammonium salt with various alkylating agents, such as dimethylsulfate or methyliodide or acid-addition salts with an organic or inorganic acid, by conventional means. These salts are more soluble in water than the original bases so that they are preferable to administer through mouth.

The compounds of this invention exhibit excellent antibacterial activity in vitro as well as in vivo. Table I shown below will illustrate the antibacterial activity of these compounds, which is superior to the known antibacterial agent, nalidixic acid, by the minimum inhibitory concentration ($\gamma$/ml) of the representative compounds of this invention using a semisynthetic medium for Shigella dysenteriae. In this Table, the substituents $R^3$, $R^6$ and $R^8$, correspond to those of formula (I).

Table I: Minimum Inhibitory Concentration ($\gamma$/ml; 37°C., 48 hours)

|  | Compound A | Compound B | Compound C | Nalidixic acid |
|---|---|---|---|---|
| $R^3$ | Methyl | Methyl | Methyl |  |
| $R^6$ | Ethyl | Ethyl | Ethyl |  |
| $R^8$ | -OCH$_2$CH$_2$N⟨ | -OCH$_2$CH$_2$N⟨O | -OCH$_2$OCOCH$_3$ |  |
| Esherichia coli 0111 | <1.6 | <1.6 | <1.6 | 3.2 |
| Shigella dysenteriae Hanabusa | <1.6 | <1.6 | <1.6 | 3.2 |

Table I: Minimum Inhibitory Concentration ($\gamma$/ml; 37°C., 48 hours)

Table I—Continued

| | Compound A | Compound B | Compound C | Nalidixic acid |
|---|---|---|---|---|
| $R^3$ | Methyl | Methyl | Methyl | |
| $R^6$ | Ethyl | Ethyl | Ethyl | |
| $R^8$ | -OCH$_2$CH$_2$N◯ | -OCH$_2$CH$_2$N◯O | -OCH$_2$OCOCH$_3$ | |
| Shigella flexneri 253 | <1.6 | <1.6 | <1.6 | 6.3 |
| Salmonella typhosa H901 | <1.6 | <1.6 | <1.6 | 3.2 |
| Staphylococcus aureus Terajima | 25 | 25 | 12.5 | >100 |
| Corynebacterium diphtheriae PW8 | 12.5 | 12.5 | 12.5 | 25 |

Table II shown below will illustrate the superiority of the blood level of some representative compounds of this invention. The blood levels are expressed as those of Compound D, which were obtained by a comparison of the diameters of the inhibitory area with serum samples collected from a test monkey. The monkey was administered each test compound (400 mg/kg body weight), with the standard curve plotting the inhibitory diameters corresponding to certain concentrations of Compound D.

Table II: Blood Level of the Representative Compound of this Invention After Administration Through the Mouth ($\gamma$/ml)

| | Compound D | Compound A | Compound B | Compound E |
|---|---|---|---|---|
| $R^3$ | Methyl | Methyl | Methyl | Methyl |
| $R^6$ | Ethyl | Ethyl | Ethyl | Ethyl |
| $R^8$ | -ONa | -OCH$_2$CH$_2$N◯ | -OCH$_2$CH$_2$N◯O | -OCH$_2$CH$_2$N◯-CH$_3$ |
| 2 hours after | 1.2 | 17.4 | 4.5 | 15.0 |
| 6 hours after | 0.3 | 4.7 | 0.4 | 23.3 |

EXAMPLE 1

(Preparation of Starting Material)

A. A mixture of 4.7g of ethyl 9-hydroxy-2-methylthiothiazolo[5,4-f]-quinoline-8-carboxylate, 4.1g of potassium carbonate and 11.5g of ethyliodide in 94 ml of dimethylformamide was stirred at 100°–105°C. for 3.5 hours and then concentrated under reduced pressure. The residue was extracted with hot chloroform and the solvent was evaporated to dryness. The resulting product was recrystallized from acetone to give 4.1g of ethyl-6,9-dihydro2-methylthio-9-oxothiazole[5,4-f]-quinoline-8-carboxylate appearing as colorless needles; mp>197°–199°C.

Analysis calculated for $C_{16}H_{16}O_3N_2S_2$:

| | C 55.15, | H 4.63, | N 8.04 |
|---|---|---|---|
| found | C 55.11, | H 4.59, | N 7.86 |

B. To a stirred solution of 10.4g of the product in 500 ml of glacial acetic acid there was added dropwise, 120 ml of a 7.5% aqueous potassium permanganate solution during one hour at 30°–40°C. The reaction mixture was stirred at the same temperature for another 1.5 hours, and sodium sulfite and ice water were added to the mixture. The resulting precipitate was collected and washed with water and methanol. The crude product was recrystallized from 1,2-dichloroethane to yield 8.0g of ethyl 6-ethyl-6,9-dihydro-2-methylsulfonyl-9-oxothiazolo[5,4-f]quinoline-8-carboxylate appearing as pale yellow prisms; mp>235°–236°C.

Analysis calculated for $C_{16}H_{16}O_5N_2S_2$:

| | C 50.51, | H 4.24, | N 7.37 |
|---|---|---|---|
| found | C 50.54, | H 3.95, | N 7.66 |

C. A suspension of 0.38g of the product in 7.6 ml of 10% aqueous potassium hydroxide was stirred at 80°C. (bath temperature) for 1.5 hours. After cooling, the reaction mixture was acidified with acetic acid and the resulting precipitate was collected, washed with water and dried in air. The crude product was recrystallized from dimethylformamide to give 0.24g of 6-ethyl-6,9-dihydro-2-hydroxy-9-oxothiazolo[5,4-f]quinoline-8-carboxylic acid appearing as colorless needles; mp>300°C.

Analysis calculated for $C_{13}H_{10}O_4N_2S$:

| | C 53.78, | H 3.47, | N 9.65 |
|---|---|---|---|
| found | C 53.51, | H 3.56, | N 9.88 |

D. A mixture of 0.58g of the product, 0.41g of potassium carbonate, 1.05g of methyliodide and 12ml of dimethylformamide was stirred at 90°–100°C. for 1.5 hours. After removal of the insoluble material, the reaction mixture was concentrated in vacuo and the residue was treated with water. The resulting product was collected, washed with water and dried. Recrystallization from methanol gave 0.51g of methyl 6-ethyl-2,3,6,9-tetrahydro-3-methyl-2,9-dioxothiazole[5,4-f]quinoline-8-carboxylate appearing as colorless needles melting at 274°–275°C.

Analysis calculated for $C_{15}H_{14}O_4N_2S$:

|  | C | H | N |
|---|---|---|---|
|  | C 56.60, | H 4.43, | N 8.80 |
| found | C 56.43, | H 4.16, | N 8.85 |

E. A mixture of 0.32g of the product, 0.4ml of concentrated Diethylaminoethyl acid and 4ml of 90% acetic acid was refluxed for 1.5 hours with stirring. After cooling, the mixture was diluted with water and the crystals precipitated were collected by filtration, washed with water and dried. The crude product was recrystallized from dimethylformamide to give 0.21g of 6-ethyl-2,3,6,9-tetrahydro-3-methyl-2,9-dioxothiazolo[5,4-f]quinoline-8-carboxylic acid appearing as colorless needles; mp>300°C.

Analysis calculated for $C_{14}H_{12}O_4N_2S \cdot 1/4H_2O$:

|  | C | H | N |
|---|---|---|---|
|  | C 54.44, | H 4.08, | N 9.07 |
| found | C 54.69, | H 3.82, | N 9.04 |

F. In 60ml of newly distilled thionyl chloride, 6.0g of the product obtained above was added and the mixture was stirred at room temperature for two hours. The resulting mixture was concentrated in vacuo and 30ml of dichloroethane was added to the residue. Crystals were collected by filtration and washed with dichloroethane. The crystals were dried in vacuo at 40°C. over phosphorous pentoxide to give 4.9g (77.4%) of a colorless-slightly yellowish powder of 6-ethyl-2,3,6,9-tetrahydro-3-methyl-2,9-dioxothiazolo[5,4-f]quinoline-8-carbonyl chloride having a mp of 290°–295°C. The compound shows a charactertistic absorbence of acid halogenide at 1780cm$^{-1}$ in an infrared absorption spectrum.

Analysis calculated for $C_{14}H_{11}N_2O_3SCl$:

|  | C | H | N |
|---|---|---|---|
|  | C 52.10, | H 3.44, | N 8.68 |
| found | C 51.77, | H 3.43, | N 8.51 |

EXAMPLE 2

(Preparation of Starting Material)

One gram of 6-ethyl-2,3,6,9-tetrahydro-3-methyl-2,9-dioxothiazolo [5,4-f]quinoline-8-carboxylic acid was mixed sufficiently with one gram of fine crushed phosphorous pentachloride and the mixture was heated at 100°–120°C. for one hour to give a dark green wet product. After cooling, chloroform was added to the product. Precipitate was collected by filtration, washed with chloroform and dried in vacuo to give 0.68g (64%) of 6-ethyl-2,3,6,9-tetrahydro-3-methyl-2,9-dioxothiazolo[5,4-f]quinoline-8-carboxylchloride.

EXAMPLE 3

Three grams of 6-ethyl-2,3,6,9-tetrahydro-3-methyl-2,9-dioxothiazolo[5,4-f]quinoline-8-carboxylic acid, 8.2g of potassium carbonate in the form of fine powder and 60ml of dimethylformamide were mixed. The mixture was heated for two hours at 100°C. (bath temperature) with stirring vigorously. Then 5.2g of diethylaminoethylchloride hydrochloride was added to the resulting mixture, which was heated at the same temperature with stirring for two hours. After the reaction, the dimethylformamide was evaporated to dryness in vacuo and the residue was poured into water. The crystals precipitated were collected by filtration and recrystallized from chloroform-ethanol to give 3.4g (yield 85%) of diethylaminoethyl 6-ethyl-2,3,6,9-tetrahydro-3-methyl-2,9-dioxothiazolo[5,4-f]quinoline-8-carboxylate with a mp 217°–219°C. The product was dissolved in diluted hydrochloric acid and the solution was concentrated in vacuo. To the concentrate there was added acetone and the white precipitate given was collected by filtration, then recrystallized from methanol-acetone to yield the corresponding hydrochloride in the form of colorless needles with a mp above 300°C.

Analysis calculated for $C_{20}H_{25}N_3O_4S \cdot HCl \cdot H_2O$:

|  | C | H | N |
|---|---|---|---|
|  | C 52.45, | H 6.16, | N 9.18 |
| found | C 52.51, | H 5.92, | N 9.04 |

EXAMPLES 4–9

According to the same procedure as in Example 3, the following products were obtained. Diethylaminoethyl 2,3,6,9-tetrahydro-3,6-dimethyl-2,9-dioxothiazolo [5,4-f]quinoline-8-carboxylate hydrochloride (76%) in the form of colorless needles; mp above 300°C.

Analysis calculated for $C_{19}H_{23}N_3O_4S \cdot 1.5H_2O$:

|  | C | H | N |
|---|---|---|---|
|  | C 50.38, | H 6.01, | N 9.28 |
| found | C 50.45, | H 5.65, | N 9.30 |

Dimethylaminoethyl 6-ethyl-2,3,6,9-tetrahydro-3methyl-2,9-dioxothiazolo [5,4-f]quinoline-8-carboxylate hydrochloride (72%) in the form of colorless needles; mp above 300°C.

Analysis calculated for $C_{18}H_{21}N_3O_4S \cdot HCl \cdot 2H_2O$:

|  | C | H | N |
|---|---|---|---|
|  | C 48.27, | H 5.85, | N 9.38 |
| found | C 48.25, | H 5.48, | N 9.52 |

Dimethylaminopropyl 6-ethyl-2,3,6,9-tetrahydro-3-methyl-2,9-dioxothiazolo[5,4-f]quinoline-8-carboxylate hydrochloride (75%) in the form of colorless needles; mp above 300°C.

Analysis calculated for $C_{19}H_{23}N_3O_4S \cdot HCl \cdot 2H_2O$:

|  | C | H | N |
|---|---|---|---|
|  | C 49.39, | H 6.11, | N 9.10 |
| found | C 49.78, | H 5.70, | N 9.28 |

Piperidinoethyl 6-ethyl-2,3,6,9-tetrahydro-3-methyl-2,9-dioxothiazolo [5,4-f]quinoline-8-carboxylate hydrochloride in the form of colorless needles; mp above 300°C. Yield 88%.

Analysis calculated for $C_{21}H_{25}N_3O_4S \cdot HCl \cdot h_2O$:

|  | C | H | N |
|---|---|---|---|
|  | C 53.66, | H 6.10, | N 8.77 |
| found | C 52.21, | H 5.87, | N 8.47 |

2-methylpiperidinoethyl 6-ethyl-2,3,6,9-tetrahydro-3-methyl-2,9-dioxothiazolo[5,4-f]quinoline-8-carboxylate hydrochloride in the form of colorless needles; mp 205°–207°C. Yield 76%.
Analysis calculated for $C_{22}H_{27}N_3O_4S \cdot HCl$:

|  | C 52.63, | H 6.42, | N 8.37 |
|---|---|---|---|
| found | C 52.18, | H 5.93, | N 8.20 |

Morpholinoethyl 6-ethyl-2,3,6,9-tetrahydro-3-methyl-2,9-dioxothiazolo [5,4-f]quinoline-8-carboxylate hydrochloride in the form of colorless needles; mp above 300°C. Yield 74%.
Analysis calculated for $C_{20}H_{23}N_3O_5S \cdot HCl \cdot 5H_2O$:

|  | C 49.94, | H 5.66, | N 8.74 |
|---|---|---|---|
| found | C 49.93, | H 5.36, | H 8.34 |

EXAMPLE 10

In 120ml of dimethylformamide, 6.08g of 6-ethyl-2,3,6,9-tetrahydro-3methyl-2,9-dioxothiazolo[5,4-f]quinoline-8-carboxylic acid, 8.3g of potassium carbonate in the form of fine powder and 10.2g of chloromethylbenzoate were added. The mixture was heated for five hours at 100°C. with stirring. Then the solvent was evaporated to dryness in vacuo and the residue was poured into water. The precipitate was collected by filtration and recrystallized from dimethylformamide-methanol (1:1) to give 4.38g (yield 50%) of benzoyloxymethyl 6-ethyl-2,3,6,9-tetrahydro-3-methyl-2,9-dioxothiazolo[5,4-f]quinoline-8-carboxylate in the form of colorless needles with a mp of 236°–238°C.
Analysis calculated for $C_{22}H_{18}N_2O_6S \cdot 1/2H_2O$:

|  | C 59.05, | H 4.28, | N 6.26 |
|---|---|---|---|
| found | C 59.01, | H 4.18, | N 6.32 |

EXAMPLE 11

In 250ml of dimethylformamide there were added 7.6g of 6-ethyl-2,3,6,9-tetrahydro-3-methyl-2,9-dioxothiazolo[5,4-f]quinoline-8-carboxylic acid, 10.3g of potassium carbonate in the form of fine powder and 13.3g of chloromethyl acetate. The mixture was heated for five hours at 100°C. with stirring. Then the resulting mixture was filtered to remove the insoluble materials. The filtrate was concentrated to dryness in vacuo. To the residue, an alkaline solution was added and the precipitate yielded was collected by filtration and crystallized from dimethylformamide-methanol to give 4.22g (yield 44.8%) of acetoxymethyl 6-ethyl-2,3,6,9-tetrahydro-3-methyl-2,9-dioxothiazolo[5,4-f]quinoline-8-carboxylate in the form of colorless needles having a decomposition point of 257°C.
Analysis calculated for $C_{17}H_{16}N_2O_6S$:

|  | C 54.24, | H 4.29, | N 7.44 |
|---|---|---|---|
| found | C 53.24, | H 4.34, | N 7.41 |

EXAMPLE 12

In 250ml of dimethylformamide there were added 5.0g of 6-ethyl-2,3,6,9-tetrahydro-3-methyl-2,9-dioxothiazolo[5,4-f]quinoline-8-carboxylic acid, 7.0g of potassium carbonate in the form of fine powder and 6.25g of chloromethyl pivalate($(CH_3)_3CCOOCH_2Cl$). The mixture was heated for two hours at 100°C. with stirring. Then, the resulting mixture was filtered to remove the insoluble materials. The filtrate was concentrated to dryness in vacuo and the residue was extracted with 500ml of chloroform. The chloroform solution was washed with water and dried. Then, the chloroform was removed by distillation and the residue was crystallized from dimethylformamide-methanol to give 5.22g (yield 76%) of pivaloyloxymethyl 6-ethyl-2,3,6,9-tetrahydro-3-methyl-2,9-dioxothiazolo[5,4-f]quinoline-8-carboxylate in the form of colorless needles having a melting point of 270°–271°C.
Analysis calculated for $C_{20}H_{22}N_2O_6S$:

|  | C 57.40, | H 5.30, | N 6.70 |
|---|---|---|---|
| found | C 57.16, | H 5.20, | N 6.81 |

EXAMPLE 13

In 180ml of dimethylformamide there were added 6.08g of 6-ethyl-2,3,6,9-tetrahydro-3-methyl-2,9-dioxothiazolo[5,4-f]quinoline-8-carboxylic acid, 8.3g of potassium carbonate in the form of fine powder and 8.2g of n-butylchloride. The mixture was heated for two hours at 100°C. (bath temperature) with stirring vigorously. After reaction, the solvent was evaporated off and the residue was poured into water. Then insoluble material was collected by filtration and recrystallized from chloroform-ether to give 5.5g (yield 76%) of n-butyl 6-ethyl-2,3,6,9-tetrahydro-3-methyl-2,9-dioxathiazolo[ 5,4-f]quinoline-8-carboxylate in the form of colorless powder with a melting point of 232°–234°C.
Analysis calculated for $C_{18}H_{20}N_2O_4S$:

|  | C 59.98, | H 5.59, | N 7.77 |
|---|---|---|---|
| found | C 60.13, | H 5.55, | N 7.88 |

EXAMPLE 14

In 100ml of dimethylformamide were added 3.3g of 3-allyl-2,3,6,9-tetrahydro-6-ethyl-2,9-dioxothiazolo[5,4-f]quinoline-8-carboxylic acid, 4.2g of potassium carbonate in the form of fine powder and 0.4g of allylbromide. The mixture was heated at 100°C. (bath temperature) for three hours with stirring. After the reaction, the solvent was evaporated off, the residue given was poured into water and collected by filtration then recrystallized from methanol to give 2.2g (yield 58.8%) of allyl 3-allyl-6-methyl-2,3,6,9-tetrahydro-2,9-dioxothiazolo-[5,4-f]quinoline-8-carboxylate in the form of colorless needles having a melting point of 202°–204°C.
Analysis calculated for $C_{19}H_{18}N_2O_4S \cdot 1/4H_2O$:

|  | C 60.87, | H 4.97, | N 7.47 |
|---|---|---|---|
| found | C 60.64, | H 4.88, | N 7.42 |

EXAMPLE 15

In 150ml of dimethylformamide there were added 3.04g of 6-ethyl-2,3,6,9-tetrahydro-3-methyl-2-9-dioxothiazolo[5,4-f]quinoline-8-carboxylic acid, 6.9g of potassium carbonate in the form of fine powder and 4.9g of N-β-chloroethyl-3-oxomorpholine. The mixture was heated at 100°C. for 1.5 hours with stirring. Then the resulting mixture was filtered to remove the insoluble materials. The filtrate was concentrated in vacuo to dryness. The residue was extracted with chloroform and dried. The solvent was evaporated off to give precipitates, which were recrystallized from dimethylformamide to give 2.36g (yield 55%) of 3-oxomorpholinoethyl 6-ethyl-2,3,6,9-tetrahydro-3-methyl-2-9-dioxothiazolo[5,4-f]quinoline-8-carboxylate in the form of colorless needles having a melting point of 243°–245°C.

Analysis calculated for $C_{20}H_{21}N_3O_6S$:

|  | C 55.67, | H 4.91, | N 9.71 |
|---|---|---|---|
| found | C 56.19, | H 4.49, | N 10.17 |

EXAMPLE 16

In 150ml of dimethylformamide there were added 3.04g of 6-ethyl-2,3,6,9-tetrahydro-3-methyl-2,9-dioxothiazolo[5,4-f]quinoline-8-carboxylic acid, 6.9g of potassium carbonate in the form of fine powder and 4.47g of N-chloroethyl-2-oxozolidon. The mixture was heated at 100°C. for 2.5 hours with stirring and filtered to remove insoluble materials. The filtrate was concentrated in vacuo. To the residue, benzene was added to crystallize. The crystals were collected by filtration, washed with water and recrystallized from ethanol to give 2.14g (yield 51.2%) of 2-oxooxazolidinoethyl 6-ethyl-2,3,6,9-tetrahydro-3-methyl-2,9-dioxothiazolo[5,4-f]quinoline-8-carboxylate in the form of colorless needles having a mp of 221°–223°C.

Analysis calculated for $C_{19}H_{19}N_3O_6S$:

|  | C 54.67, | H 4.59, | N 10.07 |
|---|---|---|---|
| found | C 54.67, | H 4.79, | N 10.51 |

EXAMPLE 17

In 100ml of dichloroethane, 2.1g of 6-ethyl-2,3,6,9-tetrahydro-3-methyl-2,9-dioxothiazolo[5,4-f]quinoline-8-carboxylic acid chloride was suspended. To the suspension, a solution of 0.7g of N-methylpiperazine in 20 ml of dichloroethane was added dropwise with stirring on an ice bath. Then the resulting solution was made to react at room temperature for 1.5 hours and the resulting white precipitates were collected by filtration. The precipitates were recrystallized from isobutanol to give 2.2g (yield 80.5%) of 6-ethyl-2,3,6,9-tetrahydro-3-methyl-8-(4-methylpiperazino)carbonyl-2,9-dioxothiazolo[5,4-f]quinoline hydrochloride in the form of colorless needles with a melting point of 253°–255°C.

Analysis calculated for $C_{19}H_{20}N_4O_3S.HCl$:

|  | C 54.22, | H 5.03, | N 13.31 |
|---|---|---|---|
| found | C 54.18, | H 5.02, | N 13.30 |

EXAMPLE 18

In 150 ml of dichloroethane, 3.2 g of 6-ethyl-2,3,6,9-tetrahydro-3-methyl-2,9-dioxothiazolo[5,4-f]quinoline-8-carboxylic acid chloride was suspended.

To the suspension, a dichloroethane solution of 1.2 g of diethylaminoethylamine was added dropwise on ice bath. Then the solution was made to react at room temperature for two hours and the solvent was evaporated in vacuo. To the residue, 10% of hydrochloric acid was added and the resulting solution was filtered to remove insoluble materials. The filtrate was made alkaline to crystallize gradually and the crystals were collected by filtration and recrystallized from chloroformether to give 2.5 g (yield 62%) of 6-ethyl-2,3,6,9-tetrahydro-3-methyl-8-diethylaminoethylaminocarbonyl-2,9-dioxothiazolo [5,4-f] quinoline in the form of colorless needles having a melting point of 210°C.

Analysis calculated for $C_{20}H_{26}N_4O_3S.1/2H_2O$:

|  | C 58.37, | H 6.61, | N 13.61 |
|---|---|---|---|
| found | C 58.64, | H 6.19, | N 13.08 |

EXAMPLE 19

In 180 ml of n-butanol, there was added 3.2 g of 6-ethyl-2,3,6,9-tetrahydro-3-methyl-2,9-dioxothiazolo [5,4-f] quinoline-8-carboxylic acid chloride. The mixture was stirred at room temperature for 30 minutes and concentrated in vacuo to dryness. To the residue there was added water and crystals were collected by filtration to give 3.2 g (yield 89%) of n-butyl 6-ethyl-2,3,6,9-tetrahydro-3-methyl-2,9-dioxothiazolo [5,4-f] quinoline-8-carboxylate in the form of colorless needles.

Analysis calculated for $C_{18}H_{20}N_2O_4S$:

|  | C 59.98, | H 5.59, | N 7.77 |
|---|---|---|---|
| found | C 59.72, | H 5.38, | N 7.81 |

EXAMPLE 20

According to the same manner as in Example 19, 3.5 g of 2,3,6,9-tetrahydro-6-methyl-3-n-propyl-2,9-dioxothiazolo [5,4-f] quinoline-8-carboxylic acid chloride and 100 ml of n-propanol were treated. The product was recrystallized from ethanol to give 3.0 g (yield 80%) of n-propyl 6-methyl-3-n-propyl-2,3,6,9-tetrahydro-2,9-dioxothiazolo-[5,4-f] quinoline-8-carboxylate in the form of colorless needles with a mp 239°–241°C.

Analysis calculated for $C_{18}H_{20}N_2O_4S$:

|  | C 59.98, | H 5.59, | N 7.77 |
|---|---|---|---|
| found | C 60.26, | H 5.65, | N 7.48 |

EXAMPLE 21

In 100 ml of dimethylformamide were added 3.04 g of 6-ethyl-2,3,6,9-tetrahydro-3-methyl-2,9-dioxothiazolo [5,4-f] quinoline-8-carboxylic acid, 5.52 g of potassium carbonate powder and 5.0 g of ethylenebromohydrin. The mixture was heated at 100°C for four hours. After removing the insoluble materials, the mixture was concentrated in vacuo and water was added to the residue. The precipitate given was collected by filtration and recrystallized from dimethylformamide to give 1.9 g (yield 54.4%) of hydroxyethyl 6-ethyl 2,3,6,9-tetrahydro-3-methyl-2,9-dioxothiazolo [5,4-f] quinoline-8-carboxylate in the form of colorless needles with mp 248°–250°C.

Analysis calculated for $C_{16}H_{16}N_2O_5S$:

| found | C 55.16, | H 5.63, | N 8.04 |
|---|---|---|---|
|  | C 55.06, | H 4.56, | N 8.12 |

EXAMPLE 22

According to the same procedure as in Example 17, using 1-methyl-4-aminopiperazine, 6-ethyl-2,3,6,9-tetrahydro-3-methyl-8-(4-methylpiperazinoamino)carbonyl-2,9-dioxothiazolo [5,4-f] quinoline hydrochloride in the form of colorless needles (crystallized from methanol) was given, mp 291°–293°C (decomposed) yield 78%.

Analysis calculated for $C_{19}H_{23}N_5O_3S \cdot HCl \cdot H_2O$:

| found | C 50.05, | H 5.75, | N 15.36 |
|---|---|---|---|
|  | C 50.37, | H 5.49, | N 15.61 |

EXAMPLE 23

In 50 ml of ethylenebromohydrin there was added 15 g of 6-ethyl-2,3,6,9-tetrahydro-3-methyl-2,9-dioxothiazolo [5,4-f] quinoline-8-carboxylic acid chloride and the mixture was stirred at room temperature for 30 minutes. 100 ml of water was added to the resulting mixture and a white precipitate was collected by filtration. The precipitate was washed with acetone, dried and crystallized from dimethylformamide to give 13 g (yield 68.5%) of bromoethyl 6-ethyl-2,3,6,9-tetrahydro-3-methyl-2,9-dioxothiazolo [5,4-f] quinoline-8-carboxylate in the form of colorless needles with mp 237°–239°C.

Analysis calculated for $C_{16}H_{15}N_2O_4SBr$:

| found | C 46.72, | H 3.68, | N 6.81 |
|---|---|---|---|
|  | C 46.53, | H 3.73, | N 6.50 |

EXAMPLE 24

According to the same procedure as in Example 3, N-methyl-piperadinoethyl 6-ethyl-2,3,6,9-tetrahydro-3-methyl-2,9-dioxothiazolo [5,4-f] quinoline-8-carboxylate.dihydrochloride in the form of colorless needles (recrystallized from ethanol) with a mp above 280°C was attained.

EXAMPLE 25

A mixture of three grams of 6-ethyl-2,3,6,9-tetrahydro-3-methyl-2,9-dioxothiazolo [5,4-f] quinoline-8-carboxylic acid, 6.3 g of potassium carbonate in the form of fine powder, 150 ml of dimethylformamide and 4.75 g of 4-methylpiperidinoethylchloride hydrochloride was treated according to the same procedure as in Example 3 and the crude product was recrystallized from acetone to give 3.85 g (yield 88%) of 4-methylpiperidinoethyl 6-ethyl-2,3,6,9-tetrahydro-3-methyl-2,9-dioxothiazolo [5,4-f] quinoline-8-carboxylate with a melting point of 190°–192°C (decomposed). The product was treated with diluted hydrochloric acid and acetone to give the corresponding hydrochloride with a mp of about 240°C. Colorless crystals.

Analysis calculated for $C_{22}H_{27}N_3O_4S \cdot HCl \cdot H_2O$:

| found | C 54.50, | H 6.25, | N 8.68 |
|---|---|---|---|
|  | C 54.55, | H 5.92, | N 8.74 |

Although the present invention has been adequately described in the foregoing specification and examples included therein, it is readily apparent that various changes and modifications can be made thereto without departing from the spirit and scope thereof.

What is claimed is:

1. A compound having the formula:

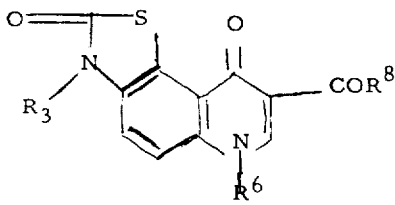

wherein $R^3$ is $C_1-C_6$ lower alkyl or $C_1-C_6$ alkenyl; $R^6$ is $C_1-C_6$ lower alkyl; and $R^8$ is an —OR, or —NHR" group, in which R is a member selected from the group consisting of an $C_1-C_6$ lower alkylamino $C_1-C_6$ lower alkyl, a piperidino $C_1-C_6$ lower alkyl, an $C_1-C_6$ lower alkyl piperidino $C_1-C_6$ lower alkyl, an alkanoyloxy $C_1-C_6$ lower alkyl, a hydroxy $C_1-C_6$ lower alkyl, a halogeno $C_1-C_6$ lower alkyl, $C_1-C_6$ lower alkyl, an oxooxazolidino $C_1-C_6$ lower alkyl, $C_1-C_6$ lower alkenyl; and R" is an $C_1-C_6$ lower alkyl amino $C_1-C_6$ lower alkyl, or the pharmaceutically acceptable acid-addition salt thereof.

2. A compound having the formula of claim 1 wherein the compound is:
   piperidinoethyl 6-ethyl-2,3,6,9-tetrahydro-3-methyl-2,9-dioxothiazolo [5,4-f] quinoline-8-carboxylate or the acid-addition salt thereof.

3. A compound having the formula of claim 1 wherein the compound is:
   4-methylpiperidinoethyl 6-ethyl 2,3,6,9-tetrahydro-3-methyl-2,9-dioxothiazol [5,4-f] quinoline-8-carboxylate or the acid-addition salt thereof.

4. A compound having the formula of claim 1 wherein the compound is:
   2-methylpiperidinoethyl 6-ethyl-2,3,6,9-tetrahydro-3-methyl-2,9-dioxothiazolo [5,4-f] quinoline-8-carboxylate or the acid addition salt thereof.

5. A compound having the formula of claim 1 wherein the compound is:
   2-oxooxazolidinoethyl 6-ethyl-2,3,6,9-tetrahydro-3-methyl-2,9-dioxothiazolo [5,4-f] quinoline-8-carboxylate, or the acid addition salt thereof.

6. A compound having the formula of claim 1 wherein the compound is:
   bromoethyl 6-ethyl-2,3,6,9-tetrahydro-3-methyl-2,9-dioxothiazolo [5,4-f] quinoline-8-carboxylate acid or the acid-addition salt thereof.

7. A compound having the formula of claim 1 wherein the compound is:
   hydroxyethyl 6-ethyl-2,3,6,9-tetrahydro-3-methyl-2,9-dioxothiazolo [5,4-f] quinoline-8-carboxylate or the acid-addition salt thereof.

8. A compound having the formula of claim 1 wherein the compound is:
   n-butyl 6-ethyl-2,3,6,9-tetrahydro-3-methyl-2,9-dioxothiazolo [5,4-f] quinoline-8-carboxylate or the acid-addition salt thereof.

9. A compound having the formula of claim 1 wherein the compound is:
dimethylaminoethyl 6-ethyl-2,3,6,9-tetrahydro-3-methyl-2,9-dioxothiazolo [5,4-f] quinoline-8-carboxylate or the acid-addition salt thereof.

10. A compound having the formula of claim 1 wherein the compound is:
diethylaminoethyl 6-ethyl-2,3,6,9-tetrahydro-3-methyl-2,9-dioxothiazolo[5,4-f] quinoline-8-carboxylic acid or the acid-addition salt thereof.

11. A compound having the formula of claim 1 wherein the compound is:
dimethylaminopropyl 6-ethyl-2,3,6,9-tetrahydro-3-methyl-2,9-dioxothiazolo [5,4-f] quinoline-8-carboxylate or the acid-addition salt thereof.

12. A compound having the formula of claim 1 wherein the compound is:
diethylaminoethyl 3,6-dimethyl-2,3,6,9-tetrahydro-2,9-dioxothiazolo [5,4-f] quinoline-8-carboxylate or the acid-addition salt thereof.

13. A compound having the formula of claim 1 wherein the compound is:
benzoyloxymethyl 6-ethyl-2,3,6,9-tetrahydro-3-methyl-2,9-dioxothiazolo [5,4-f] quinoline-8-carboxylate or the acid-addition salt thereof.

14. A compound having the formula of claim 1 wherein the compound is:
acetoxymethyl 6-ethyl-2,3,6,9-tetrahydro-3-methyl-2,9-dioxothiazolo [5,4-f] quinoline-8-carboxylate or the acid-addition salt thereof.

15. A compound having the formula of claim 1 wherein the compound is:
pivaloyloxymethyl 6-ethyl-2,3,6,9-tetrahydro-3-methyl-2,9-dioxothiazolo [5,4-f] quinoline-8-carboxylate or the acid-addition salt thereof.

16. A compound having the formula of claim 1 wherein the compound is:
allyl 3-allyl-6-ethyl-2,3,6,9-tetrahydro-2,9-dioxothiazolo [5,4-f] quinoline-8-carboxylate or the acid-addition salt thereof.

17. A compound having the formula of claim 1 wherein the compound is:
n-propyl 3-n-propyl-6-methyl-2,3,6,9-tetrahydro-2,9-dioxothiazolo [5,4-f] quinoline-8-carboxylate or the acid-addition salt thereof.

18. A compound having the formula of claim 1 wherein the compound is:
6-ethyl-2,3,6,9-tetrahydro-3-methyl-8-(diethylaminoethylamino)-carbonyl-2,9-dioxothiazolo [5,4-f] quinoline or the acid addition salt thereof.

19. A compound of the formula:

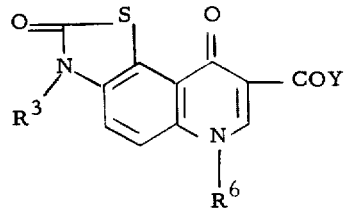

wherein $R^3$ and $R^6$ are defined as in claim 1 and Y is a hydroxy group or a halogen atom.

20. A compound having the formula of claim 19 wherein the compound is:
6-ethyl-2,3,6,9-tetrahydro-3-methyl-2,9-dioxothiazolo [5,4-f] quinoline-8-carbonyl chloride.

21. A compound having the formula of claim 19 wherein the compound is:
3,6-dimethyl-2,3,6,9-tetrahydro-2,9-dioxothiazolo [5,4-f] quinoline-8-carbonyl chloride.

* * * * *